(12) United States Patent
Yamamoto et al.

(10) Patent No.: US 6,564,935 B1
(45) Date of Patent: May 20, 2003

(54) COATING SOLUTION, METHOD AND KIT FOR PREPARING THE SAME, AND METHOD FOR WATER-REPELLENT TREATMENT USING THE SAME

(75) Inventors: Hiroaki Yamamoto, Osaka (JP); Kazutaka Kamitani, Osaka (JP); Mitsuhiro Kawazu, Osaka (JP); Mitsuo Asai, Gunma (JP)

(73) Assignee: Nippon Sheet Glass Co., Ltd., Osaka (JP)

( * ) Notice: Subject to any disclaimer, the term of this patent is extended or adjusted under 35 U.S.C. 154(b) by 0 days.

(21) Appl. No.: 09/705,076

(22) Filed: Nov. 2, 2000

(30) Foreign Application Priority Data

Nov. 4, 1999 (JP) ............................................. 11-314463

(51) Int. Cl.⁷ .......................... B65D 69/00; C08G 77/24
(52) U.S. Cl. ......................... 206/223; 524/858; 528/42; 106/287.16
(58) Field of Search ................................ 428/447, 428, 428/429; 427/421, 429, 430.1, 165, 167; 524/837, 858; 106/287.1, 287.16; 528/42; 206/223

(56) References Cited

U.S. PATENT DOCUMENTS

| 5,405,929 | A | | 4/1995 | Kobayashi | |
|---|---|---|---|---|---|
| 5,808,125 | A | | 9/1998 | Standke et al. | |
| 5,997,943 | A | * | 12/1999 | Azzopardi et al. | 427/167 |
| 6,001,485 | A | * | 12/1999 | Kobayashi et al. | 427/167 |
| 6,177,582 | B1 | | 1/2001 | Jenkner et al. | |
| 6,235,833 | B1 | * | 5/2001 | Akamatsu et al. | 524/588 |
| 6,251,989 | B1 | * | 6/2001 | Edelmann et al. | 524/837 |
| 6,338,905 | B1 | * | 1/2002 | Akamatsu et al. | 428/428 |

FOREIGN PATENT DOCUMENTS

| EP | 0 846 715 | 10/1997 |
|---|---|---|
| JP | 5-311156 | 11/1993 |
| JP | 9-53065 | 2/1997 |
| JP | 9-104861 | 4/1997 |
| JP | 10-219235 | 8/1998 |

* cited by examiner

Primary Examiner—Robert Dawson
Assistant Examiner—Michael J Feely
(74) Attorney, Agent, or Firm—Merchant & Gould P.C.

(57) ABSTRACT

A coating solution for water-repellent, oil-repellent, stain-proofing treatment is provided which does not become cloudy even if it is stored for a long time. Furthermore, a method for water-repellent, oil-repellent, stain-proofing treatment with the use of this coating solution is provided. The coating solution for water-repellent, oil-repellent, and stain-proofing treatment is obtained by mixing a first solution containing a fluoroalkyl group-containing silane and a second solution containing acid and a solvent, and this coating solution is used for the method for water-repellent, oil-repellent, stain-proofing treatment.

19 Claims, No Drawings

COATING SOLUTION, METHOD AND KIT FOR PREPARING THE SAME, AND METHOD FOR WATER-REPELLENT TREATMENT USING THE SAME

BACKGROUND OF THE INVENTION

1. Field of the Invention

The present invention relates to a solution for treatment of an article whose surface is to have water-repellent, oil-repellent, and stain-proofing properties, and further relates to a method for manufacturing the same. In particular, the present invention relates to a solution for water-repellent, oil-repellent, and stain-proofing treatment which is suitably used for articles such as glass, ceramics, plastics, and metals, and further relates to a method for manufacturing the same.

2. Description of the Related Art

For formation of a water repellent coating film on the surface of an article such as a glass sheet etc., a coating solution containing a fluoroalkyl silane is used widely as a water-repellent treatment solution.

For example, JP-A-5-311156 discloses a water repellent treatment solution. The solution is an alcohol solution containing fluoroalkyl silane in an amount between 1.0 and 10 wt %, an acid catalyst in an amount between 0.01 and 5 wt %, and water in an amount between 0.01 wt % and 40 wt %.

Furthermore, JP-A-9-53065 discloses solutions for water repellent treatment including a first solution containing a fluoroalkyl silane and a hydrophilic organic solvent, and a second solution containing acid and water. Another water repellent treatment solution is further disclosed herein in which the first solution and/or the second solution contain either alcohol as a solvent or a solvent containing alcohol.

In addition, JP-A-9-53065 points out the following problem in the solution of JP-A-5-311156 described above. As the content of fluoroalkyl silane increases, the effectiveness of water repellency improves. On the other hand, a substance which is believed to be a hydrolyzate of excessive fluoroalkyl silane remains on the treated surface to cause significant deterioration of an initial contact angle. Furthermore, it is necessary to wipe out this substance from the treated surface.

In order to solve this problem, it is discussed in JP-A-9-53065 to reduce the content of fluoroalkyl silane to 1 wt % or less.

However, if the content of fluoroalkyl silane is reduced to 1 wt % or less, it is pointed out that the water repellent treatment solution gradually loses its effectiveness of water repellency as the storage time passes. Particularly in the case where an effective amount of acid is contained in the water repellent treatment solution, it is also pointed out that the effectiveness of water repellency deteriorates considerably as the storage time passes.

Moreover, JP-A-10-219235 discloses solutions for water repellent treatment including a first solution containing a fluoroalkyl silane and a hydrophilic organic solvent, and a second solution containing acid, water, the hydrophilic organic solvent, and/or a compound with a higher boiling point than that of the hydrophilic organic solvent.

In JP-A-10-219235, a dry process for wiping a residue of fluoroalkyl silane without using an organic solvent also is proposed.

In addition, JP-A-9-104861 discloses a two-solution type water repellent treatment solution which is used in two steps. The first treatment is conducted with a first water repellent treatment solution containing fluoroalkyl silane, and the finishing treatment is conducted with a second lower alcohol solution.

In the aforementioned JP-A-5-311156, when the prepared water repellent treatment solution is stored for a long time, the fluoroalkyl silane reacts to allow the solution to become cloudy. The initial water repellency of the film formed from this cloudy solution is degraded.

This degradation takes place also with the treatment solutions disclosed in JP-A-9-53065 or JP-A-10-219235 when the prepared water repellent treatment solutions are stored for a long time.

SUMMARY OF THE INVENTION

In order to solve the above-mentioned problems, it is an object of the present invention to provide a coating solution for water-repellent (and/or oil-repellent and/or stain-proofing) treatment that can be stored for a long time without becoming cloudy. Furthermore, it is another object of the present invention to provide a method for water-repellent treatment with the use of this coating solution.

With regard to the coating solution for water-repellent treatment and the method for manufacturing the same, it is another object of the present invention to provide a coating solution which leaves only a small amount of fluoroalkyl silane residue. In other words, the provided solution possesses excellent water-repellent properties even if the fluoroalkyl group-containing silane compound is contained in the coating solution for water-repellent treatment at a ratio of 1 wt % or less. The present invention also provides a method for preparing this coating solution.

To solve these problems, in one aspect of the invention, the fluoroalkyl group-containing silane compound is stored first in an acid- and solvent-free state.

When it is stored in this way, the coating solution for water-repellent treatment described above will not become cloudy any more. In other words, the fluoroalkyl group-containing silane compound is to be stored in such a way that hydrolysis does not take place.

For use, a solution containing a fluoroalkyl group-containing silane compound (a first solution) and a solution containing acid and a solvent (a second solution) are to be mixed for preparing a coating solution for water-repellent (and/or oil-repellent and/or stain-proofing) treatment (hereinafter referred to occationally as a coating solution).

An embodiment of the present invention provides a coating solution obtained by mixing a first solution containing a fluoroalkyl group-containing silane and a second solution containing acid and a solvent.

Another embodiment of the present invention provides a method for preparing a coating solution containing a fluoroalkyl group-containing silane, acid, and a solvent. According to the above method, the first solution containing the fluoroalkyl group-containing silane and the second solution containing the acid and the solvent first are prepared separately and then mixed together. Furthermore, the present invention provides a method for preparing a coating solution for an article, in which the coating solution prepared as above is applied to the surface of the article. Furthermore, the present invention provides an article treated by this method, whereby a coating film with water-repellent (and/or oil-repellent and/or stain-proofing) properties is formed on the article.

A further embodiment of the present invention provides a kit for preparing a coating solution for water-repellent treatment that contains a fluoroalkyl group-containing silane, acid, and a solvent. The kit includes a first container, a first solution in the first container, a second container, and a second solution in the second container. In the above kit, the fluoroalkyl group-containing silane is contained in the first solution, and the acid and the solvent are contained in the second solution.

In the present invention, it is preferable that the first solution is substantially free from the acid and the solvent, and the second solution is substantially free from the fluoroalkyl group-containing silane compound.

In the present invention, the first solution also substantially may consist of a fluoroalkyl group-containing silane compound and at least one selected from a polysiloxane compound and a hydrolyzable silane compound expressed by $SiR_nX_{(4-n)}$, where R represents an alkyl group with 1 to 5 carbons; n=0 to 3; and X represents one selected from an alkoxyl group, halogen, an acetoxyl group, and an isocyanate group.

The above acid preferably contains at least one selected from the group consisting of hydrochloric acid, methanesulfonic acid, and p-toluenesulfonic acid.

The above solvent preferably contains an organic solvent having compatibility with water. In this case, the above solvent also may contain water. Furthermore, the above solvent preferably contains at least one alcohol selected from alcohols with 1 to 10 carbons. In addition, the above solvent preferably contains at least one alkane selected from alkanes with 4 to 14 carbons.

The fluoroalkyl group-containing silane preferably is expressed by the following formula:

$$CF_3\text{—}(CF_2)_n\text{—}R\text{—}SiX_pY_{3-p} \quad \text{(Formula 1)}$$

In the Formula (1), n represents an integer between 0 and 12, preferably an integer between 3 and 12; R represents a bivalent organic group with 1 to 10 carbons (e.g. methylene group, ethylene group) or a group containing a silicon atom and an oxygen atom; X represents H, a monovalent hydrocarbon group with 1 to 4 carbons (e.g. alkyl group, cycloalkyl group, allyl group), or a substituent selected from derivatives of these groups, or hydrogen; p represents 0, 1, or 2; and Y represents a group with 1 to 4 carbons selected from an alkoxyl group, an acyloxy group, and a halogen atom.

The above fluoroalkyl group-containing silane preferably is contained at a ratio between 0.01 wt % and 5 wt % of the above coating solution. The above acid preferably is contained in an amount so that the coating solution has acid concentration between 0.0001N and 1N. The above alcohol preferably is contained at a ratio between 1 wt % and 99 wt % of the above coating solution. The above alkane preferably is contained at a ratio between 1 wt % and 99 wt % of the above coating solution. The above water preferably is contained at a ratio between 0.1 wt % and 5 wt % of the above coating solution.

It is preferable that the above first solution further contains at least one selected from a polysiloxane compound and a hydrolyzable silane expressed by $SiR_nX_{(4-n)}$.

An article which is to be treated with the coating solution is e.g. one made of glass, ceramics, plastics, and metals.

With respect to the method for applying the coating solution to the article, it is possible to use a hand coating, a dip coating, a flow coating, a curtain coating, a spin coating, a spray coating, a bar coating, a roll coating, and a brush coating.

As for compounds of the above Formula (1), examples can be shown as follows:

$$C_6F_{13}CH_2CH_2Si(OCH_3)_3 \quad \text{(Formula 2)}$$

$$C_7F_{15}CH_2CH_2Si(OCH_3)_3 \quad \text{(Formula 3)}$$

$$C_8F_{17}CH_2CH_2Si(OCH_3)_3 \quad \text{(Formula 4)}$$

$$C_9F_{19}CH_2CH_2Si(OCH_3)_3 \quad \text{(Formula 5)}$$

$$C_{10}F_{21}CH_2CH_2Si(OCH_3)_3 \quad \text{(Formula 6)}$$

$$C_6F_{13}CH_2CH_2SiCl_3 \quad \text{(Formula 7)}$$

$$C_7F_{15}CH_2CH_2SiCl_3 \quad \text{(Formula 8)}$$

$$C_8F_{17}CH_2CH_2SiCl_3 \quad \text{(Formula 9)}$$

$$C_9F_{19}CH_2CH_2SiCl_3 \quad \text{(Formula 10)}$$

$$C_{10}F_{21}CH_2CH_2SiCl_3 \quad \text{(Formula 11)}$$

$$\underset{\underset{C_8F_{17}CH_2CH_2Si(OCH_3)_2}{|}}{CH_3} \quad \text{(Formula 12)}$$

$$C_8F_{17}CH_2CH_2Si(OC_2H_5)_3 \quad \text{(Formula 13)}$$

$$C_8F_{17}CH_2CH_2Si(OCOCH_3)_3 \quad \text{(Formula 14)}$$

$$CF_3\text{—}\underset{CF_3}{\overset{}{CF}}(CF_2)_8CH_2CH_2Si(OCH_3)_3 \quad \text{(Formula 15)}$$

Among the above formulas, it is particularly preferable to use $C_8F_{17}CH_2CH_2Si(OCH_3)_3$ (heptadecafluorodecyltrimethoxysilane) as well as $C_8F_{17}CH_2CH_2Si(CH_3)(OCH_3)_2$.

It is preferable that the fluoroalkyl group-containing silane is contained at a ratio between 0.01 wt % and 5 wt % of the coating solution, and particularly at a ratio of 1 wt % or less. Even with this ratio, it is effective in obtaining excellent water-repellency, oil-repellency, and stain-proofing property.

Therefore, excessive hydrolyzate of fluoroalkyl silane is less likely to remain on the treated surface. As a result, the procedure of wiping it off from the treated surface is no longer necessary or is easier.

Moreover, since the fluoroalkyl group-containing silane compound is an expensive material, less use of this material is also advantageous for cost reduction.

If the fluoroalkyl group-containing silane compound is contained in the coating solution at a small ratio and the application is performed inappropriately, the water-repellent, oil-repellent, and stain-proofing properties sometimes become unsatisfactory. Therefore, it is preferable that the ratio of content is not less than 0.1 wt %.

With respect to the fluoroalkyl group containing-silane compound, there are some compounds that are highly viscous or solid, so that the mixture with the second solution is sometimes difficult. It is therefore preferable in the present invention to use a fluoroalkyl group containing-silane compound with low viscosity.

The article treated with the coating solution of the present invention generally expresses its water-repellency, oil-repellency, and stain-proofing property through the fluoroalkyl group contained in the fluoroalkyl group containing-silane compound. In other words, the presence of water repellency simultaneously implies the presence of oil repellency or stain-proofing property.

The acid used for the present invention functions as a catalyst in the hydrolysis reaction. The kind of the acid is not particularly limited. Those used preferably are e.g. hydrochloric acid, methanesulfonic acid, and p-toluenesulfonic acid since it is possible to obtain water-repellent and stain-proofing coating films that show high weather resistance.

In the present invention, the acid is preferably contained in an amount so that the acid concentration expressed as normality is between 0.0001N and 1N of the coating solution.

If the acid concentration is low and the application is performed inappropriately, the water-repellent, oil-repellent, and stain-proofing properties sometimes become unsatisfactory. Therefore, the acid concentration of not less than 0.005N is preferable.

Generally, higher acid concentration can perform better water-repellent, oil-repellent, and stain-proofing treatment. However, in the case where volatile hydrochloric acid is used, it is necessary to handle it with caution when the acid concentration becomes too high. Therefore, the acid concentration of not more than 0.2N is preferable.

For the purpose of hydrolyzing the first solution with the second solution, water may be added to the second solution in an amount between 0.1 wt % and 5wt %.

However, depending on the composition of the coating solution, a large amount of water content might deteriorate the property of the coating solution to be wiped off easily. Thus, the water preferably is added not more than 2 wt %.

The solvent contained in the second solution is not particularly limited, as long as the solvent easily can dissolve acid or water. For example, alcohol solvents with 1 to 10 carbons, particularly those with a high evaporation rate at room temperature such as ethanol, 1-propanol, 2-propanol, n-butanol, i-butanol, s-butanol, and t-butanol are used preferably. Furthermore, acetone can be used as solvent since acetone can be mixed with water in any amount.

Instead of the above alcohol solvents, a nonpolar solvent also may be used. For example, when a nonpolar solvent such as alkane with 5 to 10 carbons is used, the hydrolyzed fluoroalkyl silane compound tends to react more easily with the surface of the article, so that it is preferable.

Furthermore, both of the above alcohol solvents and a nonpolar solvent also may be used.

It will be explained to containers for storing and circulating the first and the second solutions described above. First, a container for the second solution will contain acid and a solvent (specifically, e.g. alcohol, alkane, and also water). Therefore, a suitable container should be made of materials which are not affected by these chemicals which will be poured into the container and stored for a long period of time. Specifically, it is possible to use a container made of high density polyethylene, polytetrafluoroethylene (Teflon, product name) resin, and glass etc. Among these materials, high density polyethylene is most suitable for the use from the reasons of cost, safety, and easy processing procedure.

The container preferably is constructed so as to be tightly closed and easily handled by a screw cap. Alternatively, it is preferable to use a polyethylene container whose opening can be sealed by fusion. This fused and sealed structure is particularly preferable since solutions can be protected against liquid spill and also against influence of moisture contained in the outside air.

Next, a container for the first solution will store less amount of solution than that for the second solution, so that it is preferable to use a pipette-shaped container which can be sealed with a quantity for each use. The container for the second solution also preferably is sealed when a quantity for each use is poured into the polyethylene container.

For mixing and adjusting treatment solutions, the first solution may be poured directly into the container of the second solution, or the first and the second solutions may be poured into another container for mixing.

Furthermore, the container of the mixed treatment solution preferably can be equipped with an attachable nozzle for easy application.

As for the application method, an easy and a preferred way is to immerse a cotton cloth, paper, a sponge or the like in the coating solution and to apply it to a glass and rub it in by hand. Other methods may be also used, for example, a dip coating, a flow coating, a curtain coating, a spin coating, a spray coating, a bar coating, a roll coating, and a brush coating.

The coating solution of the present invention basically is prepared by mixing a fluoroalkyl group-containing silane compound (a first solution) with a solution obtained by adding an acid catalyst to a solvent and stirring it for 10 seconds to 60 minutes (a second solution), and then stirring the mixture for 10 seconds to 60 minutes.

The prepared coating solution lasts for a rather long time. However, if the amount of the acid catalyst is rather small or the amount of water is too large, it should be used for application within one day after the preparation in fear that hydrolysis and condensation polymerization reaction may progress too far in the coating solution before being applied. After the coating solution is applied to the surface of an article, the article is left for 10 seconds to 10 minutes at room temperature for evaporation of the solvent. In this way, it is possible to obtain an article with water-repellent, oil-repellent, and stain-proofing properties.

According to the method for water-repellent, oil-repellent, and stain-proofing treatment of the present invention, the coating solution is applied to the surface of an article, and the applied wet film as well as the article can be left in this state to be dried at room temperature.

Furthermore, for the purpose of enhancing the bonding of the coating solution with the surface of the article, heat treatment at about 200° C. or lower may be also performed.

The treatment according to the present invention can be applied to transparent and opaque objects of a plate shape, a stick shape, or of other various shapes such as glass plates, ceramic plates, plastic plates, or metal plates. Among the above objects, it is preferably applied to those which particularly require transparency such as a window glass or a side mirror of vehicles, and also to articles such as glass plates used for buildings, for example, a display window.

If there are less hydrophilic groups available on the surface of the article, it is preferable to conduct a treatment whereby the hydrophilic property is enhanced. Specifically, this procedure of enhancing the hydrophilic property can be conducted by treating the surface of the article in advance in a plasma containing oxygen or in a corona atmosphere, or by irradiating ultraviolet rays of a wave length around 200 to 300 nm on the surface of the article in an atmosphere containing oxygen. It is preferable to perform the treatment for water-repellent, oil-repellent, and stain-proofing properties after such a procedure of enhancing the hydrophilic property is performed.

With respect to the article to be treated according to the present invention, the treatment for water-repellent, oil-repellent, and stain-proofing properties may be performed after a metal-oxide layer is formed as a base layer on the surface of the article for further improvement of durability.

As for the formation method of the base layer, for example, a metal-oxide layer mainly composed of silica can be formed by means of a sol-gel method. It is also possible to form a silica layer by means of a sputtering method or a CVD method, or to form a metal-oxide layer of e.g. silica-alumina, silica- titania, and silica- zirconia. Furthermore, there is also a method called a liquid-phase deposition method (LPD method) whereby a silica layer is deposited by adding ammonium to a saturated fluorosilicic acid solution.

The surface of the base layer may be formed in any shape such as a flat shape, an embossed shape, or a porous shape.

DESCRIPTION OF THE PREFERRED EMBODIMENTS

Hereinafter, preferred embodiments of the present invention will be described. In the respective embodiments and comparative examples, the following chemicals and materials were used.

* Fluoroalkyl Group-containing Silane Compound heptadecafluorodecyltrimethoxysilane:
 $CF_3(CF_2)_7(CH_2)_2 Si(OCH_3)_3$, manufactured by Shin-Etsu Chemical Co., Ltd., hereinafter abbreviated as "FAS".

* Additive Agent polydimethylsiloxane: "KF96", manufactured by Shin-Etsu Chemical Co., Ltd., hereinafter abbreviated as "DMS".

tetraethoxysilane: $Si(OC_2H_5)_4$, hereinafter abbreviated as "TEOS".

* Solvent acetone: manufactured by Katayama Chemical, Inc.

i-propyl alcohol: manufactured by Katayama Chemical, Inc., hereinafter abbreviated as "IPA".

t-butyl alcohol: manufactured by Katayama Chemical, Inc., hereinafter abbreviated as "tBuOH".

isoalkane mixtures:
 "ISOSOL 300, (product name)", (hydrocarbon with 6 to 14 carbons, mainly composed of hydrocarbon with 12 carbons) "ISOSOL 200 (product name)", (hydrocarbon with 4 to 10 carbons, mainly composed of hydrocarbon with 8 carbons), both manufactured by Nippon Petrochemicals Co., Ltd., hereinafter abbreviated as "I300" and "I200" respectively.

ethanol+n-propanol+IPA: SOLMIX AP-7 (product name), manufactured by Nippon Kasei Chemical Co., Ltd., hereinafter abbreviated as "AP7".

* Acid Catalyst hydrochloric acid: concentrated hydrochloric acid (35 wt %), manufactured by Kanto Chemical Co., Ltd. 1N, 0.1N hydrochloric acid, manufactured by Kanto Chemical Co., Ltd.

oxalic acid: manufactured by Kanto Chemical Co., Ltd.

p- toluenesulfonic acid: manufactured by Tokyo Chemical Co., Ltd., hereinafter abbreviated as "PTS".

methanesulfonic acid: manufactured by Tokyo Chemical Co., Ltd., hereinafter abbreviated as "MS".

nitric acid: 1N nitric acid, manufactured by Kanto Chemical Co., Ltd.

oleic acid: manufactured by Tokyo Chemical Co., Ltd.

The acid concentration in the present specification was calculated, provided that the added acid was diverged at 100%, by dividing the molar quantity of hydrogen ion by the total volume of all the compounds before mixed for the above treatment solution.

* Substrate glass substrate: glass plate composed of soda lime silicate glass, produced by a float glass process (size: 150×150×3 mm)

* Evaluation Method of Water-repellent, Oil-repellent, Stain-proofing Properties

[Contact Angle of Water]

In order to evaluate water-repellent, oil-repellent, stain-proofing properties of treated articles, a contact angle of water was measured as a representative property. By using a contact angle measuring instrument (CA-DT manufactured by Kyowa Surface Science Co., Ltd.), a water droplet 2 mg in weight was dripped on the surfaces of the treated articles, and static contact angles were measured at that time. The higher value of the contact angle shows that the static water repellent property is more excellent.

[Weather Resistance]

Ultraviolet rays were irradiated on the treated articles for examination of the weather resistance.

By using a ultraviolet resistance testing machine ("I-SUPER UV TESTER W-13" manufactured by Iwasaki Electric Co., Ltd.), ultraviolet rays were irradiated altogether for 200 hours with a cycle of irradiation for 20 hours and darkness for 4 hours under the conditions of ultraviolet intensity 76±2mW/cm$^2$, black panel temperature 48±2° C., and 30 seconds of ion exchange water showering conducted every one hour. After the irradiation, the contact angle of water of the treated articles was measured by means of the method described above.

Embodiment 1-1

In Embodiment 1-1, a first solution that is exclusively FAS and a second solution exclusively consisting of hydrochloric acid (catalyst) and alcohol are used. This embodiment is carried out in the following steps.

(1) As a fluoroalkyl group-containing silane compound, 5 g of FAS was used to prepare a first solution.

(2) As an acid catalyst, 5 g of concentrated hydrochloric acid was dissolved and mixed in 90 g of i-propanol, and a second solution was prepared.

(3) The first solution and the second solution were mixed and left for about 5 minutes, and a coating solution was obtained.

(4) A cotton cloth immersed in 1 ml of the coating solution was applied to a clean glass substrate and rubbed into the substrate.

(5) Any remaining coating solution was wiped off from the glass substrate with a new cotton cloth, and a treated glass was obtained.

With respect to the water repellent glass obtained above, the initial contact angle of water was 109 degrees, and the contact angle of water after the weather resistance test was 95 degrees. The first and the second solutions were mixed respectively at ratios expressed by percent by weight in Table 1. The initial contact angles and the contact angles after the weather resistance test also are shown in Table 1.

Next, the treated glass was attached to a reciprocating slide abrasion tester (manufactured by Shinto Science Co., Ltd.), and the surface of the glass was abraded with a dry cloth for 5000 times to and fro under a load of 0.3 kg/cm$^2$, and the abrasion resistance was measured. Thereafter, the above method was employed to measure the contact angle of water of the treated glass. The contact angle after the abrasion test was 101 degrees.

Then, the first solution and the second solution were left at room temperature for one month. However, there was no apparent change observed with both first and second solutions. Furthermore, the first solution and the second solution were mixed, but the mixed solution did not become cloudy. This solution was further used for the same water repellent treatment, but the water repellency remained the same.

Also in the following embodiments, although the first solution and the second solution were left at room temperature, there was no apparent change observed in both solutions. Moreover, when the first solution and the second solution were mixed, the mixed solution did not become cloudy.

It is clear from Embodiment 1-1 that the second solution contained in the treatment solution of the present invention may consists of an acid catalyst and an alcohol solvent.

Embodiments 3-1 to 3-4

Embodiments 3-1 to 3-4 are examples which use Embodiment 2-2 as the base, while the concentration of hydrochloric acid was varied. Specifically, the acid concentration was varied between 0.00077N and 0.38N.

In all embodiments, the initial contact angles and the contact angles after the weather resistance test were excellent. In these embodiments, the normalities [N] of acid as the coating solution were calculated by the method described above and also shown in Table 1.

It is clear from these embodiments that excellent water-repellent, oil-repellent, and stain-proofing treatment can be performed in the wide range of acid concentration.

Embodiments 4-1 to 4-4

Embodiments 4-1 to 4-4 are examples which use Embodiment 2-2 as the base, while the kind of acid catalyst was varied. In all embodiments, the initial contact angles were excellent. The contact angles after the weather resistance test were of slightly smaller values when oxalic acid and 1N nitric acid were used.

TABLE 1

| First Solution | | Second Solution | | | | | | | | Initial CA (°) | After Weather Resistance CA (°) |
|---|---|---|---|---|---|---|---|---|---|---|---|
| Ex. | FAS (wt %) | Acid | Catalyst (wt %) | Water (wt %) | IPA (wt %) | Acetone (wt %) | AP7 (wt %) | tBuOH (wt %) | I300 (wt %) | I200 (wt %) | | |
| 1-1 | 5.0 | c-HCl | 5.0 | — | 90.0 | — | — | — | — | — | 109.0 | 95.0 |
| 2-1 | 5.0 | c-HCl | 1.0 | — | — | — | 54.0 | — | 40.0 | — | 109.4 | 96.2 |
| 2-2 | 1.0 | c-HCl | 1.0 | — | — | — | 58.0 | — | 40.0 | — | 109.4 | 95.8 |
| 2-3 | 0.5 | c-HCl | 1.0 | — | — | — | 58.5 | — | 40.0 | — | 109.2 | 94.2 |
| 2-4 | 0.1 | c-HCl | 1.0 | — | — | — | 58.9 | — | 40.0 | — | 107.6 | 93.8 |
| 2-5 | 0.05 | c-HCl | 1.0 | — | — | — | 58.95 | — | 40.0 | — | 107.8 | 94.0 |
| 2-6 | 0.02 | c-HCl | 1.0 | — | — | — | 58.98 | — | 40.0 | — | 107.2 | 93.7 |
| 2-7 | 0.01 | c-HCl | 1.0 | — | — | — | 58.99 | — | 40.0 | — | 107.3 | 93.0 |
| 3-1 | 1.0 | c-HCl 0.38N | 5.0 | — | — | — | 54.0 | — | 40.0 | — | 109.2 | 96.6 |
| 3-2 | 1.0 | c-HCl 0.075N | 1.0 | — | — | — | 58.0 | — | 40.0 | — | 109.4 | 95.8 |
| 3-3 | 1.0 | 1N—HCl 0.0077N | 1.0 | — | — | — | 58.0 | — | 40.0 | — | 108.9 | 93.0 |
| 3-4 | 1.0 | 1N—HCl 0.00077N | 1.0 | — | — | — | 58.0 | — | 40.0 | — | 107.5 | 93.7 |
| 4-1 | 1.0 | oxalic acid | 0.1 | — | — | — | 58.9 | — | 40.0 | — | 107.2 | 80.0 |
| 4-2 | 1.0 | PTS | 0.18 | — | — | — | 58.82 | — | 40.0 | — | 108.2 | 93.6 |
| 4-3 | 1.0 | MS | 0.09 | — | — | — | 58.91 | — | 40.0 | — | 109.2 | 93.3 |
| 4-4 | 1.0 | 1N—HNO$_3$ | 1.0 | — | — | — | 58.0 | — | 40.0 | — | 108.1 | 83.3 |

Embodiments 2-1 to 2-7

Embodiments 2-1 to 2-7 are examples in which the kind of solvent contained in the second solution in Embodiment 1-1 was changed from i-propanol to "AP7" and "ISOSOL 300", and furthermore, the amount of "FAS" was varied. The mixture ratio in each embodiment is shown at percentage by weight in Table 1. Also in Table 1, the initial contact angles and the contact angles after the weather resistance test are shown. In all embodiments, the initial contact angles and the contact angles after the weather resistance were excellent.

As clearly shown in these embodiments, even if the ratio of "FAS" contained in the coating solution is 1 wt % or less, it is effective in obtaining excellent water-repellency, oil-repellency, and stain-proofing property. In these cases, the residue of excessive hydrolyzate of "FAS" hardly was observed on the treated surface, and if at all, only a very small amount. Therefore, the procedure of wiping it out from the treated surface was no longer necessary or was easier.

It is clear from these embodiments that excellent water-repellent, oil-repellent, and stain-proofing treatment can be performed even with the use of different acid catalysts.

Among the different acid catalysts, hydrochloric acid, methanesulfonic acid, and p-toluenesulfonic acid are used particularly preferably.

Embodiments 5-1 to 5-4

Embodiments 5-1 to 5-4 are examples which use Embodiment 4-3 as the base, i.e. MS was used as the acid catalyst, while the concentration of water was varied. In all embodiments, the initial contact angles and the contact angles after the weather resistance test were excellent (See Table 2).

It is clear from these embodiments that excellent water-repellent, oil-repellent, and stain-proofing treatment can be performed even if water is further contained as a solvent in the second solution.

TABLE 2

| | First Solution | | Second Solution | | | | | | | | After Weather |
|---|---|---|---|---|---|---|---|---|---|---|---|
| Ex. | FAS (wt %) | Acid | Catalyst (wt %) | Water (wt %) | IPA (wt %) | Acetone (wt %) | AP7 (wt %) | tBuOH (wt %) | I300 (wt %) | I200 (wt %) | Initial CA (°) | Resistance CA (°) |
| 5-1 | 1.0 | MS | 0.12 | — | — | — | 58.88 | — | 40.0 | — | 108.3 | 95.3 |
| 5-2 | 1.0 | MS | 0.12 | 1.0 | — | — | 57.88 | — | 40.0 | — | 108.6 | 95.1 |
| 5-3 | 1.0 | MS | 0.12 | 2.0 | — | — | 56.88 | — | 40.0 | — | 107.9 | 94.8 |
| 5-4 | 1.0 | MS | 0.12 | 4.0 | — | — | 54.88 | — | 40.0 | — | 108.5 | 95.0 |
| 6-1 | 1.0 | PTS | 0.25 | — | 58.75 | — | — | — | 40.0 | — | 108.3 | 95.5 |
| 6-2 | 1.0 | PTS | 0.25 | — | — | 58.75 | — | — | 40.0 | — | 107.8 | 96.3 |
| 6-3 | 1.0 | PTS | 0.25 | — | — | — | 58.75 | — | 40.0 | — | 108.6 | 95.9 |
| 6-4 | 1.0 | PTS | 0.25 | — | — | — | — | 58.75 | 40.0 | — | 108.7 | 96.0 |
| 7-1 | 5.0 | c-HCl | 5.0 | — | — | — | 50.0 | — | 40.0 | — | 107.8 | 97.0 |
| 7-2 | 5.0 | c-HCl | 5.0 | — | — | — | 50.0 | — | — | 40.0 | 108.4 | 96.4 |
| 8-1 | 1.0 | MS | 0.12 | — | — | — | 93.88 | — | 5.0 | — | 107.5 | 96.6 |
| 8-2 | 1.0 | MS | 0.12 | — | — | — | 88.88 | — | 10.0 | — | 109.4 | 96.8 |
| 8-3 | 1.0 | MS | 0.12 | — | — | — | 78.88 | — | 20.0 | — | 109.2 | 95.5 |
| 8-4 | 1.0 | MS | 0.12 | — | — | — | 58.88 | — | 40.0 | — | 108.3 | 95.3 |
| 8-5 | 1.0 | MS | 0.12 | — | — | — | 18.88 | — | 80.0 | — | 107.6 | 96.0 |
| 8-6 | 1.0 | MS | 0.12 | — | — | — | 8.88 | — | 90.0 | — | 109.4 | 95.9 |
| 8-7 | 1.0 | MS | 0.12 | — | — | — | 3.88 | — | 95.0 | — | 107.9 | 96.0 |

Embodiments 6-1 to 6-4

Embodiments 6-1 to 6-4 are example which use Embodiment 4-2 as the base, i.e. PTS was used as the acid catalyst, and the solvent contained in the second solution was varied by changing the combination of "ISOSOL 300" with acetone and various alcohols. In all embodiments, the initial contact angles and the contact angles after the weather resistance test were excellent (See Table 2).

It is clear from these embodiments that excellent water-repellent, oil-repellent, and stain-proofing treatment can be performed even if the combinations of alkane, acetone, and alcohols with various carbons are used as the solvent in the second solution.

Embodiments 7-1 to 7-2

Embodiments 7-1 to 7-2 are examples in which the kind of alkane in "ISOSOL 300" and "200" was compared in the solvent contained in the second solution. "AP7" also is contained in the second solution.

In all embodiments, the initial contact angles and the contact angles after the weather resistance test were excellent (See Table 2).

It is clear from these embodiments that excellent water-repellent, oil-repellent, and stain-proofing treatment can be performed even if different kinds of alkane are used as the solvent in the second solution.

Embodiments 8-1 to 8-7

Embodiments 8-1 to 8-7 are examples which use Embodiment 5-1 as the base, while the combination ratio of alkane, i.e."ISOSOL 300" to alcohol, i.e. "AP7" was varied in the solvent contained in the second solution. In all embodiments, the initial contact angles and the contact angles after the weather resistance test were excellent (See Table 2).

It is clear from these embodiments that excellent water-repellent, oil-repellent, and stain-proofing treatment can be performed even if the combination ratio of alkane to alcohol is varied as the solvent in the second solution.

Embodiments 9-1 to 9-2

In all of the above embodiments, the first solution was exclusively "FAS". In these embodiments, polydimethylsiloxane or tetraethoxysilane was further added to the first solution. The acid catalyst was determined to be MS.

In all embodiments, the initial contact angles and the contact angles after the weather resistance test were excellent (See Table 3).

In Embodiment 9-1, polydimethylsiloxane further was added as an example of polysiloxane compound to the first solution. At this stage, water droplet of 5 mm in diameter were placed on the surface of the treated substrate, and the substrate was inclined gradually until the water droplet started to roll down at a certain angle, which was determined to be a fall angle and used for evaluation. In this embodiment, the fall angle was excellent with the result of 8.5 degrees.

As a comparative example, the fall angle in above Embodiment 5-1 was 12.3 degrees. As a result, the addition of polydimethylsiloxane to the coating solution proved to allow water droplet to fall more easily.

In Embodiment 9-2, tetraethoxysilane was added to the first solution as an example of hydrolyzable silane compound represented by $SiR_nX_{(4-n)}$.

When tetraethoxysilane is added, a $SiO_2$ film can be formed at the same time. This substrate was examined by the abrasion resistance test described above, which showed an excellent value of 103.1 degrees in the contact angle after the abrasion test. As a comparative example, the contact angle after the abrasion test in the above Embodiment 5-1 was 92.3 degrees. According to the results, the water-repellent, oil-repellent, and stain-proofing films obtained after the treatment proved to have excellent durability (abrasion resistance).

TABLE 3

| | First Solution | | | Second Solution | | | Initial CA (°) | After UV CA (°) | Fall Degrees (°) | After Abrasion CA (°) |
|---|---|---|---|---|---|---|---|---|---|---|
| Ex. | FAS (wt %) | Additive | Agent (wt %) | Acid | Catalyst (wt %) | AP7 (wt %) | I300 (wt %) | | | |
| 9-1 | 0.5 | DMS | 0.2 | MS | 0.12 | 58.88 | 40.0 | 108.3 | 95.3 | 8.5 | — |
| 9-2 | 0.5 | TEOS | 0.2 | MS | 0.12 | 58.88 | 40.0 | 108.3 | 95.3 | — | 103.1 |

Embodiments 10-1 to 10-5

In Embodiments 4-1 to 4-4 described above, the kind of the acid catalyst was varied in the combined solvents of "AP7" and "ISOSOL 300" contained in the second solution. Embodiments 10-1 to 10-4 are examples in which the kind of the acid catalyst was varied in the combined solvents of "ISOSOL 300" and "tBuOH".

In all embodiments, the initial contact angles were excellent. The contact angles after the weather resistance test were of slightly smaller values when 1N hydrochloric acid and 1N nitric acid were used (See Table 4).

It is clear from these embodiments that excellent water-repellent, oil-repellent, and stain-proofing treatment can be performed even if different kinds of acid are used in the combined solvents of "ISOSOL 300" and "tBuOH".

contained in the second solution was varied by changing the combination of "ISOSOL 300" with acetone and various alcohols. Embodiments 12-1 to 12-3 are examples in which the acid catalyst was determined to be 1N hydrochloric acid, while the solvent contained in the second solution was varied by changing the combination of "ISOSOL 300" with acetone and various alcohols.

In all embodiments, the initial contact angles and the contact angles after the weather resistance test were excellent (See Table 4).

It is clear from these embodiments that excellent water-repellent, oil-repellent, and stain-proofing treatment can be performed even if the combinations of "ISOSOL 300" with acetone and various alcohols are used as the solvent in the second solution.

татаке 4

| | First Solution | | Second Solution | | | | | | | | After Weather | |
|---|---|---|---|---|---|---|---|---|---|---|---|---|
| Ex. | FAS (wt %) | Acid | Catalyst (wt %) | Water (wt %) | IPA (wt %) | Acetone (wt %) | AP7 (wt %) | tBuOH (wt %) | I300 (wt %) | I200 (wt %) | Initial CA (°) | Resistance CA (°) |
| 10-1 | 1.0 | c-HCl | 1.0 | — | — | — | — | 50.0 | 48.0 | — | 109.2 | 89.5 |
| 10-2 | 1.0 | 1N—HCl | 1.0 | — | — | — | — | 50.0 | 48.0 | — | 107.6 | 85.5 |
| 10-3 | 1.0 | 1N—HNO₃ | 1.0 | — | — | — | — | 50.0 | 48.0 | — | 108.1 | 83.3 |
| 10-4 | 1.0 | PTS | 0.18 | — | — | — | — | 49.8 | 48.0 | — | 108.2 | 91.6 |
| 10-5 | 1.0 | MS | 0.09 | — | — | — | — | 49.91 | 48.0 | — | 109.0 | 91.0 |
| 11-1 | 1.0 | oleic acid | 0.1 | 1.0 | — | — | — | 49.9 | 48.0 | — | 107.2 | 80.0 |
| 11-2 | 1.0 | PTS | 0.18 | 1.0 | — | — | — | 48.8 | 48.0 | — | 108.1 | 91.5 |
| 11-3 | 1.0 | MS | 0.09 | 1.0 | — | — | — | 48.81 | 48.0 | — | 109.2 | 91.3 |
| 12-1 | 1.0 | 1N—HCl | 1.0 | — | 48.0 | — | — | — | 50.0 | — | 107.9 | 92.3 |
| 12-2 | 1.0 | 1N—HCl | 1.0 | — | — | 48.0 | — | — | 50.0 | — | 106.8 | 89.8 |
| 12-3 | 1.0 | 1N—HCl | 1.0 | — | — | — | — | 48.0 | 50.0 | — | 106.3 | 92.9 |
| 13-1 | 1.0 | 1N—HCl | 1.0 | — | 48.0 | — | — | — | — | 50.0 | 110.9 | 92.2 |
| 13-2 | 1.0 | 1N—HCl | 1.0 | — | — | 48.0 | — | — | — | 50.0 | 105.1 | 91.5 |
| 13-3 | 1.0 | 1N—HCl | 1.0 | — | — | — | — | 48.0 | — | 50.0 | 105.9 | 91.5 |

Embodiments 11-1 to 11-3

In Embodiments 5-1 to 5-4 described above, MS was used as the acid catalyst, and furthermore, the concentration of water was varied. Embodiments 11-1 to 11-3 are examples in which water was added to basically water free acid in the combined solvents of "AP7" and "tBuOH".

In all embodiments, the initial contact angles were excellent. The contact angles after the weather resistance test were of slightly smaller values when oleic acid was used (See Table 4).

It is clear from these embodiments that excellent water-repellent, oil-repellent, and stain-proofing treatment can be performed even if water is added to basically water free acid in the second solution.

Embodiments 12-1 to 12-3

In Embodiments 6-1 to 6-4 described above, the acid catalyst was determined to be "PTS", and the solvent Embodiments 13-1 to 13-3

Embodiments 13-1 to 13-3 are examples in which "ISOSOL 300" contained in the second solution in Embodiments 12-1 to 12-3 described above was changed to "ISOSOL 200".

In all embodiments, the initial contact angles and the contact angles after the weather resistance test were excellent (See Table 4).

It is clear from these embodiments that excellent water-repellent, oil-repellent, and stain-proofing treatment can be performed even if the combinations of "ISOSOL 200" with acetone and various alcohols are used as the solvent in the second solution.

Embodiments 14-1 to 14-2

Embodiments 14-1 to 14-2 are examples in which the solvent contained in the second solution in Embodiments 4-2 to 4-3 was changed from "AP7" to "IPA", and the ratio thereof to "ISOSOL 300" was changed.

In all embodiments, the initial contact angles and the contact angles after the weather resistance test were excellent (See Table 5).

furthermore, the acid was changed from "concentrated hydrochloric acid" to "methanesulfonic acid". Respective mixture ratios are shown at percentage by weight in Table 6.

TABLE 5

| First Solution | | | Second Solution | | | | | | | | | After Weather |
|---|---|---|---|---|---|---|---|---|---|---|---|---|
| Ex. | FAS (wt %) | Acid | Catalyst (wt %) | Water (wt %) | IPA (wt %) | Acetone (wt %) | AP7 (wt %) | tBuOH (wt %) | I300 (wt %) | I200 (wt %) | Initial CA (°) | Resistance CA (°) |
| 14-1 | 1.0 | PTS | 0.18 | — | 48.82 | — | — | — | 50.0 | — | 107.1 | 94.5 |
| 14-2 | 1.0 | MS | 0.09 | — | 48.91 | — | — | — | 50.0 | — | 108.5 | 95.6 |
| 15-1 | 5.0 | c-HCl | 5.0 | — | — | — | 40.0 | — | 50.0 | — | 108.8 | 95.6 |
| 15-2 | 5.0 | c-HCl | 1.0 | — | — | — | 43.0 | — | 50.0 | — | 109.0 | 95.4 |
| 15-3 | 5.0 | c-HCl | 0.1 | — | — | — | 43.9 | — | 50.0 | — | 109.4 | — |
| 15-4 | 5.0 | 1N—HCl | 1.0 | — | — | — | 44.0 | — | 50.0 | — | 109.7 | 95.1 |
| 16-1 | 5.0 | 1N—HCl | 1.0 | — | — | — | 44.0 | — | 50.0 | — | 109.7 | 95.1 |
| 16-2 | 2.0 | 1N—HCl | 1.0 | — | — | — | 47.0 | — | 50.0 | — | 108.7 | 92.8 |
| 16-3 | 1.0 | 1N-RCl | 1.0 | — | — | — | 48.0 | — | 50.0 | — | 108.0 | 92.8 |

Embodiments 15-1 to 15-4

In Embodiments 3-1 to 3-4 described above, the concentration of hydrochloric acid was varied while the concentration of "FAS" was determined to be 1.0 wt %. Embodiments 15-1 to 15-4 are examples in which the concentration of hydrochloric acid was varied while the concentration of "FAS" was determined to be 5.0 wt %.

In all embodiments, the initial contact angles and the contact angles after the weather resistance test were excellent (See Table 5).

The initial contact angles and the contact angles after the weather resistance test are shown also in Table 6.

In all embodiments, the initial contact angles and the contact angles after the weather resistance were excellent.

As clearly shown in Embodiment 17-1, the second solution contained in the treatment solution of the present invention preferably consists of an acid catalyst and an alkane solvent.

TABLE 6

| First Solution | | | Second Solution | | | | | | | | | After Weather |
|---|---|---|---|---|---|---|---|---|---|---|---|---|
| Ex. | FAS (wt %) | Acid | Catalyst (wt %) | Water (wt %) | IPA (wt %) | Acetone (wt %) | AP7 (wt %) | tBuOH (wt %) | I300 (wt %) | I200 (wt %) | Initial CA (°) | Resistance CA (°) |
| 17-1 | 5.0 | MS | 0.12 | — | — | — | — | — | 94.88 | — | 108.4 | 95.2 |

It is clear from these embodiments that excellent water-repellent, oil-repellent, and stain-proofing treatment can be performed in the wide range of acid concentration.

Embodiments 16-1 to 16-3

In Embodiments 2-1 to 2-7 described above, "FAS" was varied while the concentration of concentrated hydrochloric acid was determined to be 1.0 wt %. Embodiments 16-1 to 16-3 are examples in which the concentration of "FAS" was varied while the concentration of the acid catalyst was determined to be 1.0 wt % with 1N hydrochloric acid.

In all embodiments, the initial contact angles and the contact angles after the weather resistance test were excellent (See Table 5).

It is clear from these embodiments that excellent water-repellent, oil-repellent, and stain-proofing treatment can be performed in the wide range of "FAS" concentration.

Embodiment 17-1

Embodiment 17-1 is an example in which the kind of solvent contained in the second solution in Embodiment 1-1 was changed from "i-propanol" to "ISOSOL 300", and As clearly shown in the aforementioned embodiments, it is preferable that at least one alcohol having compatibility with water is contained as the solvent in the second solution.

Additionally, alkane is soluble in alcohol, so that alcohol preferably is used together with alkane when alkane is contained in the solvent.

In the embodiments described above, glass substrates were used as the substrates, but the same coating solution can be used for treatment of articles made of ceramics, plastics, or metals with the same effectiveness achieved in the water-repellency, oil-repellency, and stain-proofing property.

COMPARATIVE EXAMPLE 1

(1) As a fluoroalkyl group-containing silane compound, 5 g of FAS was dissolved in 45 g of i-propanol, and Solution A was prepared.
(2) Concentrated hydrochloric acid of 5 g was dissolved and mixed in 45 g of i-propanol, and Solution B was prepared.
(3) The Solution A and the Solution B were mixed and left for about 5 minutes, and a coating solution was obtained.
(4) A cotton cloth immersed in 1 ml of the coating solution was applied to a clean glass substrate and rubbed into the substrate.
(5) The excess coating solution was wiped off from the glass substrate with a new cotton cloth, and a treated glass was obtained.

With respect to the obtained water repellent glass, the contact angle of water was 109 degrees, and the contact angle of water after the weather resistance test was 94 degrees.

Then, the Solution A and the Solution B were left at room temperature for one month. In this case, the Solution A became cloudy. Furthermore, the Solution A and the Solution B were mixed and used for the treatment in the same manner. As far as the water repellent property was concerned, the initial contact angle was 109 degrees, so that the value did not change in comparison with Embodiment 1. However, the contact angle after the weather resistance test showed a low value of 75 degrees.

As described above in detail, the present invention is characterized by keeping the fluoroalkyl group-containing silane compound first in an acid- and solvent-free state for storage.

The storage in this manner has the advantage of preventing the coating solution for water-repellent, oil-repellent, and stain-proofing treatment from becoming cloudy as described above.

Furthermore, with the use of the coating solution for water-repellent, oil-repellent, and stain-proofing treatment according to the present invention, it is effective in obtaining excellent water-repellency, oil-repellency, and stain-proofing property, even if the fluoroalkyl group-containing silane compound is contained in the coating solution at a ratio of 1 wt % or less.

Therefore, the effect thereby is that it is less likely to leave excessive hydrolyzate of fluoroalkyl silane on the treated surface. As a result, it has the additional advantage that the procedure of wiping it out from the treated surface is no longer necessary or is easier.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A kit for preparing a coating solution for water-repellant treatment, the coating solution containing a fluoralkyl group-containing silane, acid, and a solvent, wherein the kit includes a first storage container, a first solution in the first storage container, a second storage container, and a second solution in the second storage container, wherein the fluoralkyl group-containing silane is contained in the first solution, and the acid and the solvent are contained in the second solution, wherein the acid contains at least one selected from the group consisting of methanesulfonic acid and p-toluenesulfonic acid.

2. The kit for preparing a coating solution for water-repellent treatment according to claim 1, wherein the solvent contains an organic solvent having compatibility with water.

3. The kit for preparing a coating solution for water-repellent treatment according to claim 2, wherein the solvent further contains water.

4. The kit for preparing a coating solution for water-repellent treatment according to claim 3, wherein the water is contained in the second solution in an amount so as to be between 0.1 wt % and 5 wt % of the coating solution.

5. The kit for preparing a coating solution for water-repellent treatment according to claim 1, wherein the solvent contains at least one alcohol selected from alcohols with 1 to 10 carbons.

6. The kit for preparing a coating solution for water-repellent treatment according to claim 5, wherein the alcohol is contained in the second solution in an amount so as to be between 1 wt % and 99 wt % of the coating solution.

7. The kit for preparing a coating solution for water-repellent treatment according to claim 1, wherein the solvent contains at least one alkane selected from alkanes with 4 to 14 carbons.

8. The kit for preparing a coating solution for water-repellent treatment according to claim 7, wherein the alkane is contained in the second solution in an amount so as to be between 1 wt % and 99 wt % of the coating solution.

9. The kit for preparing a coating solution for water-repellent treatment according to claim 1, wherein the fluoroalkyl group-containing silane is expressed by the following formula:

$$CF_3-(CF_2)_n-R-SiX_pY_{3-p},$$

where n represents an integer between 0 and 12; R represents a bivalent organic group with 1 to 10 carbons or a group containing a silicon atom and an oxygen atom; X represents H, or a monovalent hydrocarbon group with 1 to 4 carbons or a substituent selected from derivatives of these groups, or a hydrogen; p represents 0, 1, or 2; and Y represents a group with 1 to 4 carbons selected from an alkoxy group, an aclyoxy group, and a halogen atom.

10. The kit for preparing a coating solution for water repellent treatment according to claim 9, wherein n is an integer between 3 and 12.

11. The kit for preparing a coating solution for water-repellent treatment according to claim 1, wherein the fluoroalkyl group-containing silane is contained in the first solution in an amount so as to be between 0.01 wt % and 5 wt % of the coating solution.

12. The kit for preparing a coating solution for water-repellent treatment according to claim 1, wherein the acid is contained in the second solution in the second solution in an amount so that the coating solution has acid concentration between 0.0001N and 1N.

13. The kit for preparing a coating solution for water-repellent treatment according to claim 1, wherein the first solution further contains at least one selected from a polysiloxane compound and a hydrolyzable silane expressed by $SiR_nX_{(4-n)}$, where R represents an alkyl group with 1 to 5 carbons; n=0 to 3; and X represents one selected from an alkoxyl group, halogen, an acetoxyl group, or an isocyanate group.

14. The kit for preparing a coating solution for water-repellent treatment according to claim 1, wherein the first solution is substantially free from the acid and the solvent.

15. The kit for preparing a coating solution for water-repellent treatment according to claim 1, wherein the second solution is substantially free from the fluoroalkyl group-containing silane.

16. A method for water repellent treatment of an article, comprising preparing a kit as claimed in claim 1, preparing a coating solution by mixing the first solution and the second solution, and applying the coating solution to a surface of the article.

17. The kit for preparing a coating solution for water repellent treatment according to claim 1, wherein at least one selected from the first storage container and the second storage container has a sealed structure.

18. The kit for preparing a coating solution for water repellent treatment according to claim 1, wherein the second storage container is made of high density polyethylene.

19. The kit for preparing a coating solution for water repellent treatment according to claim 1, wherein the first storage container is a pipette-shaped container.

* * * * *